No. 615,559. Patented Dec. 6, 1898.
C. M. KELLY & O. J. LINENDOLL.
BRUSH.
(Application filed Sept. 27, 1897. Renewed Nov. 9, 1898.)

(No Model.)

Witnesses.
G. E. Cilley
Shelton J. Gunn.

Inventors
Christopher M. Kelly.
Orin J. Linendoll
By Cilley & Allgier
Attorney.

UNITED STATES PATENT OFFICE.

CHRISTOPHER M. KELLY AND ORIN J. LINENDOLL, OF GRAND RAPIDS, MICHIGAN, ASSIGNORS TO THE PHOENIX INDUSTRIAL COMPANY, OF SAME PLACE.

BRUSH.

SPECIFICATION forming part of Letters Patent No. 615,559, dated December 6, 1898.

Application filed September 27, 1897. Renewed November 9, 1898. Serial No. 695,991. (No model.)

*To all whom it may concern:*

Be it known that we, CHRISTOPHER M. KELLY and ORIN J. LINENDOLL, citizens of the United States, residing at Grand Rapids, in the county of Kent and State of Michigan, have invented certain new and useful Improvements in Toilet-Brushes, of which the following is a specification.

Our invention relates to improvements in tooth and flesh brushes; and its objects are, first, to provide means for attaching a water-bulb directly to the brush in such a manner that fine sprays of water may be thrown through the bristles of the brush when it is in immediate use by pressure from the hand, and, second, to provide for connecting said bulb directly with a fountain-syringe in such a manner that it may be readily used on various parts of the body without changing the position of the syringe. We attain these objects by the mechanism illustrated in the accompanying drawings, in which—

Figure 1:
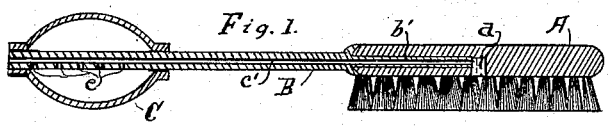
Figure 2:
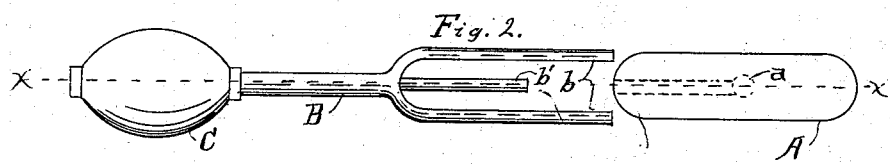
Figure 3:
Figure 4:
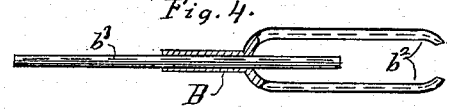

Figure 1 is a longitudinal section of a tooth-brush on the line $x\,x$ of Fig. 2. Fig. 2 is a plan of the handle and brush detached to show the manner of connecting them. Fig. 3 shows the end of the handle that receives the brush as arranged to slide the brush to place; and Fig. 4 shows the brush-support and the water-tube separate as a modification of Fig. 1, which shows a handle having a water-channel through its center.

Similar letters refer to similar parts throughout the several views.

In constructing a tooth-brush or small flesh-brush to meet the objects of our invention we form a handle B, having channel $c'$, one end of which opens into the brush A in the form of a tube $b'$, so that the water may flow out through the opening $a$ at the roots of the bristles. The opposite end of this handle is provided with a series of small apertures $c'$, that open into the bulb C, which is filled with water, so that pressure on the bulb with the hand will force the water from the bulb to the brush. We find it more desirable to make the brush-head and the handle separate, so that the head may be slid into the concave receptacles on the inner surface of the arms $b$, and thereby held to place. The ends of these arms may be straight, as in Fig. 2, or they may be slightly bent in, as $b^2$ in Fig. 4, so that they will spring over the end of the head and hold it more securely to place. This handle may be made in one piece, as shown in Fig. 1, or it may be made in two pieces, the tube being separate from and arranged to pass through the handle proper, as at $b^3$ in Fig. 4.

We do not desire to restrict ourselves to the exact form of connections herein shown and described, but reserve the right to use any legitimate modification that does not depart from the spirit of our invention as specified.

To fill the bulb with water, it is only necessary to place the brush in the water so that the orifices in the water-pipe are submerged and act upon the expansion of the bulb in the usual manner.

Having thus fully described our invention, what we claim as new, and desire to secure by Letters Patent of the United States, is—

1. The combination, in a fountain bath-brush, of a detachable head, a handle having one end spread and grooved to engage the edges of the brush back or head to hold it to place, a perforated tube projecting between and parallel with said grooved arms and into the brush-head, and a water-bulb supported upon the handle and connected to the tube to force water through the bulb and into the brush-bristles, substantially as and for the purpose set forth.

2. The combination in a fountain-brush of a detachable head, a handle having grooved forks formed at one end to embrace the brush-back, the ends of said forks turned in to clasp over the end of the head, a tube passing through said handle and perforated at one end to receive water from a water-bulb and at the other end to spray water into the bristles of the brush and a water-bulb connected therewith, substantially as and for the purpose set forth.

Signed at Grand Rapids, Michigan, September 16, 1897.

CHRISTOPHER M. KELLY.
    ORIN J. LINENDOLL.

In presence of—
 WALTER L. ALLEN,
 ITHIEL J. CILLEY.